United States Patent [19]

Miyamoto et al.

[11] 4,450,240
[45] May 22, 1984

[54] CERAMIC COMPOSITIONS HAVING HIGH DIELECTRIC CONSTANT AND HIGH SPECIFIC RESISTIVITY

[75] Inventors: Haruhiko Miyamoto; Masatomo Yonezawa, both of Tokyo, Japan

[73] Assignee: Nippon Electric Co., Ltd., Tokyo, Japan

[21] Appl. No.: 475,538

[22] Filed: Mar. 15, 1983

[30] Foreign Application Priority Data

| Mar. 17, 1982 [JP] | Japan | 57-42167 |
| Apr. 8, 1982 [JP] | Japan | 57-58563 |
| Apr. 8, 1982 [JP] | Japan | 57-58564 |
| Apr. 8, 1982 [JP] | Japan | 57-58565 |
| Apr. 8, 1982 [JP] | Japan | 57-58566 |

[51] Int. Cl.³ .................. C04B 35/00; C04B 35/46
[52] U.S. Cl. ............................................... 501/136
[58] Field of Search .................................. 501/135, 136

[56] References Cited

U.S. PATENT DOCUMENTS

| 4,048,546 | 9/1977 | Bouchard et al. | 501/136 |
| 4,379,319 | 4/1983 | Wilson | 501/134 |

FOREIGN PATENT DOCUMENTS

| 55-111011 | 8/1980 | Japan. | |
| 55-144609 | 11/1980 | Japan | 501/136 |
| 55-144611 | 11/1980 | Japan | 501/136 |
| 55-144612 | 11/1980 | Japan | 501/136 |
| 55-144470 | 11/1980 | Japan | 501/136 |
| 55-144610 | 11/1980 | Japan. | |

*Primary Examiner*—Mark Bell
*Attorney, Agent, or Firm*—Charles E. Pfund

[57] ABSTRACT

The ceramic composition comprises lead magnesium tungstate [$Pb(Mg_{\frac{1}{2}}W_{\frac{1}{2}})O_3$], lead titanate [$PbTiO_3$] and lead nickel niobate [$Pb(Ni_{\frac{1}{3}}Nb_{\frac{2}{3}})O_3$]. When the ternary composition is expressed by [$Pb(Mg_{\frac{1}{2}}W_{\frac{1}{2}})O_3$]x [$PbTiO_3$]y [$Pb(Ni_{\frac{1}{3}}Nb_{\frac{2}{3}})O_3$]z where $x+y+z=1.00$, it lies on lines interconnecting five points ($x=0.693$, $y=0.297$, $z=0.01$), ($x=0.495$, $y=0.495$, $z=0.01$), ($x=0.195$, $y=0.465$, $z=0.35$), ($x=0.10$, $y=0.40$, $z=0.50$) and ($x=0.06$, $y=0.24$, $z=0.70$) and in a region bonded by the lines. In modifications, for the purpose of improving the mechanical strength, 0.02 to 3 mol % of at least one auxiliary ingredient selected from the group consisting of Nb, Ta and Sb, 0.05 to 8 mol % of [$Pb(Mn_{\frac{1}{3}}Ta_{\frac{2}{3}})O_3$] 0.05 to 10 mol % of [$Pb(Mn_{\frac{1}{3}}Nb_{\frac{2}{3}})O_3$] or 0.05 to 6 mol % of [$Pb(Mn_{\frac{1}{3}}Sb_{\frac{2}{3}})O_3$] is added.

6 Claims, 1 Drawing Figure

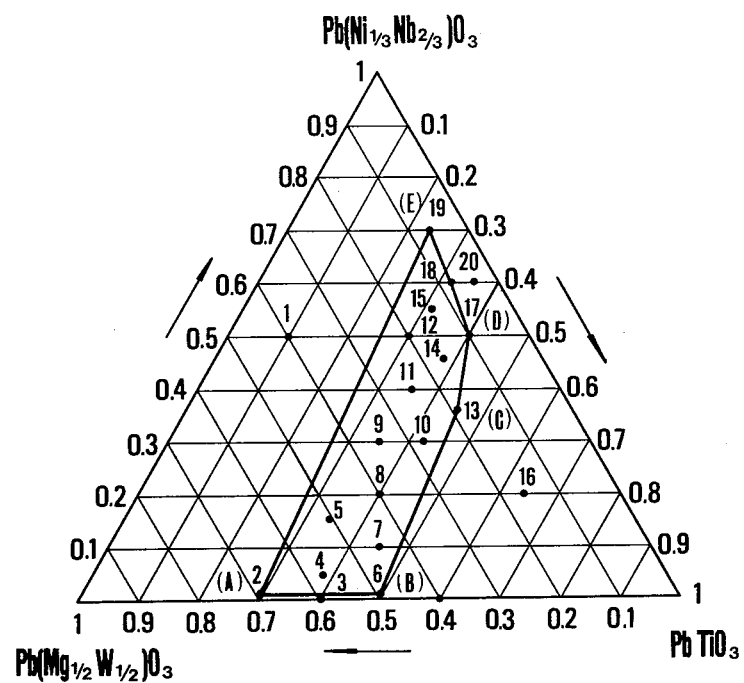

CERAMIC COMPOSITIONS HAVING HIGH DIELECTRIC CONSTANT AND HIGH SPECIFIC RESISTIVITY

BACKGROUND OF THE INVENTION

This invention relate to a ceramic composition, especially suitable for use as a dielectric material for fabricating a laminated capacitor, having a high dielectric constant, a high specific resistivity at temperatures of 20° C. and 125° C., a high mechanical strength and capability of being sintered at a temperature of from 900° to 1050° C.

When manufacturing a practical laminated capacitor by using a ceramic composition, as its electric characteristics, such factors as dielectric constant, percentage of variation thereof due to temperature variation, specific resistivity, dielectric loss, and DC bias dependency, etc. must be evaluated. More particularly, the dielectric constant and the specific resistivity must be high as far as possible, whereas the percentage of variation of the dielectric constant due to temperature variation, dielectric loss and variation in the dielectric constant caused by the DC bias must be small as far as possible. Regarding the specific resistivity, according to EIA specification Class II, it is specified that the insulating resistance should be higher than 7,500 Meg ohms or the product of resistance and capacitance (RC product) should be higher than 75 ohm F(=75 meg ohm·μF).

More particularly, unless the product of the dielectric constant and specific resistivity of a ceramic composition is larger than a predetermined absolute value, it is impossible to manufacture a capacitor having any capacitance, especially a large capacitance, and satisfying a practical regulation. Accordingly, the field of use of a ceramic composition not satisfying this condition is greatly limited. In an ordinary laminated capacitor, (n+1) internal electrodes and n (where n is a positive integer) capacitor layers having the same thickness are alternately laminated. Denoting the capacitance of each layer by Co, and the insulating resistance thereof by Ro, the capacitance C of the laminated capacitor becomes nCo, while insulating resistance R becomes Ro/n. Denoting the dielectric constant of the ceramic composition by $\epsilon$, the dielectric constant of vacuum by $\epsilon_o$, the specific resistivity of the ceramic composition by $\rho$, the thickness of each layer by d, and the overlapping electrode area by S, the capacitance Co of a single layer capacitor becomes $\epsilon_o \epsilon S/d$, and Ro becomes $\rho d/S$. Consequently, the product $C \times R$ of the capacitance C of an n-layer laminated capacitor and the insulating resistance R is expressed by an equation, $$(\rho D/nS) \times (n\epsilon_o \epsilon S/d) = \epsilon_o \epsilon \rho.$$

Thus, the CR of the laminated capacitor having any capacitance becomes constant or normalized, i.e., $\epsilon_o \epsilon \rho$.

A requirement that RC is to be higher than 75 ohm F can be fullfilled when $RC = \epsilon_o \epsilon \rho = 8.855 \times 10^{-14}$ (F/cm)$\times \epsilon \times \rho \geq 75$ ohm·F and accordingly, when $\epsilon \rho \geq 8.47 \times 10^{14}$ ohm·cm. For example where $\epsilon = 5000$, a relation $\rho \geq 1.69 \times 10^{11}$ ohm·cm is required, and where $\epsilon = 10,000$, a relation $\rho \geq 8.47 \times 10^{10}$ ohm·cm is required. With any large capacitance, laminated capacitors formed of ceramic compositions having a value of $\rho$ larger than these values in accordance with the dielectric constant can satisfy a condition $RC \geq 75$ ohm·F. Where $\epsilon$ is 5,000 and $\rho$ is less than $1.69 \times 10^{11}$ ohm·cm, to obtain an insulating resistance higher than 7500 meg·ohm, the upper limit of the capacitance would be 0.01 μF. As a consequence, with a ceramic composition having a low specific resistivity, it is impossible to obtain a laminated capacitor having a small size and a large capacity, the features of the laminated capacitor.

Where a stringent reliability is required, the BX characteristic defined by U.S. Military Specification (MIL), for example, requires an insulating resistance of more than 100,000 meg·ohm at 25° C. or a product RC of more than 1000 meg·ohm·μF. It is also defined that at 125° C. the insulating resistance should be 10000 meg·ohm or more or the product RC should be 100 meg·ohm·μF or more.

A high insulating resistance, or a small leakage current not only at room temperature but also at a high temperature, ensures that dielectric breakdown caused by thermal runaway due to an increased leakage current can be prevented and that the reliability of the capacitor can be improved.

In a laminated chip capacitor wherein the layers of the chip capacitor are soldered on a substrate, owing to the difference in their thermal expansion coefficients, the chip is subjected to a mechanical stress and tends to be cracked or damaged. In the case of a dip capacitor encapusulated in an epoxy resin casing or the like, the dip capacitor sometimes cracks due to stress applied by the encapusulation. In any case, where the ceramic composition comprising the laminated capacitor has a low bend strength, the tendency to cracking and breakage increases, thus decreasing reliability. For this reason, it is practically important to increase as far as possible the bend strength of the ceramic composition.

In addition, the internal electrodes utilized in laminated capacitors is required to have a melting point higher than the sintering temperature of the ceramic composition. For this reason, in order to make possible to use inexpensive Ag (silver) electrodes, it has been necessary to decrease as far as possible the sintering temperature. Accordingly, development of a new material that can substitute for $BaTiO_3$ system ceramic sintered at a temperature of from 1300° to 1400° C. has been desired. For example, U.S. Pat. No. 4,048,546 to R. J. Bouchard et al discloses a $Sr_xPb_{1-x}TiO_3 - Pb(Mg_{\frac{1}{3}}W_{\frac{1}{3}})O_3$ type ceramic. In this reference, $\epsilon$ is at most 8050 but nothing is taught about the specific resistivity and the mechanical characteristics of the ceramic. Japanese Preliminary Patent Publication No. 111011/1980 by Fujiwara et al discloses $Pb(Mg_{\frac{1}{3}}Nb_{\frac{2}{3}})O_3 - PbTiO_3 - Pb(Mg_{\frac{1}{2}}W_{\frac{1}{2}})O_3$ type ceramic. This reference does not at all teach the specific resistivity and the mechanical characteristics. Japanese Preliminary Patent Publication No. 144610/1980 by Fujiwara et al teaches addition of $Pb(Mn_{\frac{1}{2}}W_{\frac{1}{2}})O_3$ to $Pb(Mg_{\frac{1}{3}}Nb_{\frac{2}{3}})O_3 - PbTiO_3 - Pb(Mg_{\frac{1}{2}}W_{\frac{1}{2}})O_3$ for the purpose of improving the insulating resistance. As a reference, in Table 1 of this publication is shown the insulating resistance of a ternary composition $Pb(Mg_{\frac{1}{3}}Nb_{\frac{2}{3}})O_3 - PbTiO_3 - Pb(Mg_{\frac{1}{2}}W_{\frac{1}{2}})O_3$. Although the insulating resistance is not converted into specific resistivity, a material constant, the specific resistivity can be expressed as follows on the assumption that the percentage of shrinkage is 15% (an ordinary value) and by taking into consideration dimensions after molding. Then the insulating resistance $7 \times 10^9$ ohms of the composition No. 6 $[Pb(Mg_{\frac{1}{3}}Nb_{\frac{2}{3}})_{0.45}Ti_{0.25}(Mg_{\frac{1}{2}}W_{\frac{1}{2}})_{0.30}O_3]$ shown in the table 1 is shown by $2.1 \times 10^{11}$ ohm·cm in terms of the specific resistivity. Consequently, $\epsilon \epsilon_0 \rho = 108$ meg·ohm·μF, where $\epsilon = 5760$.

In the same manner, the insulating resistance, $8 \times 10^9$ ohm, of sample No. 11 having a composition [Pb(Mg⅓Nb⅔)₀.₁₅Ti₀.₃₀(Mg½W½)₀.₅₅O₃] is shown by $2.4 \times 10^{11}$ ohm·cm in terms of the specific resistivity. Thus, $\epsilon \epsilon_0 \rho = 98$ meg·ohm·μF (where $\epsilon = 4560$). The insulating resistance, $2 \times 10^{10}$ ohm, of sample No. 16 having a composition [Pb(Mg⅓Nb⅔)₀.₁₅Ti₀.₆₀(Mg½W½)₀.₂₅O₃] is shown by $6.1 \times 10^{11}$ ohm·cm in terms of the specific resistivity. Thus, $\epsilon \epsilon_0 \rho = 209$ meg·ohm·μF (where $\epsilon = 3900$). Even when the percentage of shrinkage varies by $15 \pm 5\%$, the specific resistivity varies by less than $\pm 10\%$ of the values shown just above. In other words, the specific resistivity of the [Pb(Mg⅓Nb⅔)O₃—PbTiO₃—Pb(Mg½W½)O₃] type composition is not sufficiently high. Japanese Preliminary Publication No. 144610/1980, Fujiwara et al, contemplates an improvement in the insulating resistance of Pb(Mg⅓Nb⅔)O₃—PbTiO₃—Pb(Mg½W½)O₃ but in this Publication, any composition having a dielectric constant larger than 10,000 is not disclosed.

As described above, a variety of known ceramic compositions are required to have higher specific resistivity and dielectric constant at temperatures of 20° C. and 125° C.

SUMMARY OF THE INVENTION

It is an object of this invention to provide ternary ceramic compositions consisting essentially of Pb(Mg½W½)O₃—PbTiO₃—Pb(Ni⅓Nb⅔)O₃ capable of being sintered at temperatures of 900° C. to 1050° C. and having high dielectric constants as well as high specific resistivities at 20° C. and 125° C. Thus, the ceramic compositions of this invention have a dielectric constant of 3,060 to 13,400, a dielectric loss of 0.3 to 3.8%, a specific resistivity of $2.0 \times 10^{12}$ to $1.2 \times 10^{13}$ ohm·cm at 20° C., $\epsilon \epsilon_0 \rho$ of 1,000 to 5,650 meg·ohm·μF, and a specific resistivity of $4.3 \times 10^{10}$ to $2.5 \times 10^{12}$ ohm·cm at 125° C.

Further more, according to this invention, Nb₂O₅, Ta₂O₅, Sb₂O₃ or Pb(Mn⅓Me⅔)O₃ (where Me represents one of Nb, Ta and Sb) are added to the ternary composition described above for greatly improving the bend strength of the ceramic composition, the dielectric loss and the specific resistance.

The ceramic composition of this invention is characterized in that the composition is expressed by [Pb(Mg½W½)O₃]$_x$[PbTiO₃]$_y$[Pb(Ni⅓Nb⅔)O₃]$_z$ where $x+y+z=1.00$, and its composition range is on lines interconnecting points A, B, C and D and E in a ternary phase diagram of the composition and in an area bounded by these lines, where A: ($x=0.693$, $y=0.297$ $z=0.01$)
B: ($x=0.495$, $y=0.495$, $z=0.01$)
C: ($x=0.195$, $y=0.455$, $z=0.35$)
D: ($x=0.10$, $y=0.40$, $z=0.50$)
E: ($x=0.06$, $y=0.24$, $z=0.70$).

Another feature of this invention lies in that oxide of at least one of Nb, Ta and Sb is added to the basic composition described above in 0.02 to 3.0% in terms of atomic percentage of metal element.

Further, according to another modification Pb(Mn⅓Nb⅔)O₃, Pb(Mn⅓Ta⅔)O₃ or Pb(Mn⅓Sb⅔)O₃ is added to the aforementioned basic composition in amounts of 0.05 to 10 mol%, 0.05 to 8 mol% and 0.05 to 6 mol%, respectively.

BRIEF DESCRIPTION OF THE DRAWING

In the accompanying drawing, a single FIGURE shows a ternary phase diagram of a basic ternary ceramic composition embodying the invention.

DESCRIPTION OF THE PREFERRED EMBODIMENTS

To have better understanding of this invention the following examples are given.

EXAMPLE 1

As starting raw materials, were used lead oxide (PbO), magnesium oxide MgO, tungsten oxide WO₃, titanium oxide TiO₂, nickel oxide NiO, and niobium oxide Nb₂O₅, each having a purity of more than 99.9%, and these raw materials were weighed to have weights as shown in the following Table I. Then the weighed materials were wet admixed in a ball mill, calcined at 750° to 800° C. and then pulverized with the ball mill. After filteration and drying, an organic binder was put into the powder and pressed into 4 circular discs each having a diameter of 16 mm and a thickness of about 2 mm. The samples falling within the composition range defined by this invention were sintered in air at a temperature of 900° to 1050° C. for one hour. Silver electrodes were bonded to the opposite surfaces of each sintered disc at a temperature of 600° C. The dielectric constant loss and capacitance were measured with a digital LCR meter at a frequency of 1 KHz, voltage of 1 $V_{rms}$, and at a temperature of 20° C. to calculate the dielectric constant. The insulating resistances at 20° C. and 125° C. were measured with a ultra high insulating resistance meter while applying voltage of 50 V for 1 minute to calculate the specific resistivity. The characteristics of a sample of a particular composition were determined by averaging the test data for four samples.

The ratio of ingredients, dielectric loss, and the specific resistivity at 20° C. and 125° C. are shown in the following Table I.

TABLE I

| Sample No. | Ratio of ternary ingredients (mol %) | | | Dielectric constant | Dielectric loss (%) | Specific resistivity at 20° C. (Ω·cm) | Specific resistivity at 125° C. (Ω·cm) |
|---|---|---|---|---|---|---|---|
| | Pb(Mg½W½)O₃ | PbTiO₃ | Pb(Ni⅓Nb⅔)O₃ | | | | |
| 1* | 40 | 10 | 50 | 420 | 0.1 | $8.3 \times 10^{12}$ | $2.7 \times 10^{11}$ |
| 2 | 69.3 | 29.7 | 1 | 3060 | 2.0 | $9.5 \times 10^{12}$ | $2.5 \times 10^{12}$ |
| 3* | 60 | 40 | — | 3990 | 1.3 | $9.3 \times 10^{11}$ | $8.2 \times 10^{9}$ |
| 4 | 57 | 38 | 5 | 6030 | 2.4 | $8.1 \times 10^{12}$ | $1.1 \times 10^{12}$ |
| 5 | 51 | 34 | 15 | 5320 | 0.8 | $1.2 \times 10^{13}$ | $1.6 \times 10^{12}$ |
| 6 | 49.5 | 49.5 | 1 | 4530 | 1.8 | $2.5 \times 10^{12}$ | $3.4 \times 10^{11}$ |
| 7 | 45 | 45 | 10 | 9230 | 3.7 | $5.6 \times 10^{12}$ | $6.3 \times 10^{11}$ |

TABLE I-continued

| Sample No. | Ratio of ternary ingredients (mol %) | | | Dielectric constant | Dielectric loss (%) | Specific resistivity at 20° C. (Ω · cm) | Specific resistivity at 125° C. (Ω · cm) |
|---|---|---|---|---|---|---|---|
| | $Pb(Mg_{\frac{1}{2}}W_{\frac{1}{2}})O_3$ | $PbTiO_3$ | $Pb(Ni_{\frac{1}{3}}Nb_{\frac{2}{3}})O_3$ | | | | |
| 8 | 40 | 40 | 20 | 7920 | 1.8 | $6.1 \times 10^{12}$ | $1.0 \times 10^{12}$ |
| 9 | 35 | 35 | 30 | 6790 | 1.0 | $8.2 \times 10^{12}$ | $6.8 \times 10^{11}$ |
| 10 | 28 | 42 | 30 | 7670 | 2.8 | $2.0 \times 10^{12}$ | $7.5 \times 10^{11}$ |
| 11 | 24 | 36 | 40 | 10530 | 1.8 | $5.5 \times 10^{12}$ | $4.3 \times 10^{11}$ |
| 12 | 20 | 30 | 50 | 7980 | 0.5 | $6.8 \times 10^{12}$ | $1.7 \times 10^{11}$ |
| 13 | 19.5 | 45.5 | 35 | 3450 | 2.2 | $4.2 \times 10^{12}$ | $8.3 \times 10^{11}$ |
| 14 | 16.5 | 38.5 | 45 | 7200 | 2.4 | $3.7 \times 10^{12}$ | $3.8 \times 10^{11}$ |
| 15 | 13.5 | 31.5 | 55 | 11880 | 1.9 | $4.1 \times 10^{12}$ | $1.5 \times 10^{11}$ |
| 16* | 16 | 64 | 20 | 1030 | 2.5 | $1.3 \times 10^{12}$ | $7.3 \times 10^{11}$ |
| 17 | 10 | 40 | 50 | 5620 | 2.3 | $4.5 \times 10^{12}$ | $1.2 \times 10^{11}$ |
| 18 | 8 | 32 | 60 | 13400 | 3.2 | $3.2 \times 10^{12}$ | $8.2 \times 10^{10}$ |
| 19 | 6 | 24 | 70 | 9250 | 0.3 | $2.8 \times 10^{12}$ | $4.3 \times 10^{10}$ |
| 20* | 4 | 36 | 60 | 14500 | 0.8 | $6.5 \times 10^{11}$ | $4.5 \times 10^{9}$ |

Remarks:
Samples marked with symbol * are not included in the scope of this invention.

As can be noted from Table I, the ternary compositions expessed by

$$Pb(Mg_{\frac{1}{2}}W_{\frac{1}{2}})O_3 - PbTiO_2 - Pb(Ni_{\frac{1}{3}}Nb_{\frac{2}{3}})O_3$$

and included in the scope of this invention have a high dielectric constant of 3060 to 13,400, small dielectric loss of 0.1 to 3.8%, a high specific resistivity of $2.0 \times 10^{12}$ to $1.2 \times 10^{13}$ ohm cm at 20° C. and $4.3 \times 10^{10}$ to $2.5 \times 10^{12}$ ohm cm at 125° C. Thus, these compositions are excellent ceramic compositions. Since the ceramic compositions of this invention manifesting these excellent characteristics can be sintered at a low temperature below 1050° C., not only the internal electrodes in the laminated capacitors can be made of low cost materials but also sintering energy and the material of the sintering furnace can be saved.

When the ternary compositions of this invention are expressed by $[Pb(Mg_{\frac{1}{2}}W_{\frac{1}{2}})O_3]x[PbTiO_3]y[Pb(Ni_{\frac{1}{3}}Nb_{\frac{2}{3}})O_3]z$ (where $x+y+z=1.00$) their compositions should be on lines interconnecting the following five points of the ternary phase diagram and in an area bounded by these lines as shown in the accompanying drawing.

(x=0.693, y=0.297, z=B 0.01)
(x=0.495, y=0.495, z=0.01)
(x=0.195, y=0.455, z=0.35)
(x=0.10, y=0.40, z=0.50)
(x=0.06, y=0.24, z=0.70).

In the phase diagram, in regions outside the lines interconnecting points 2, 6 and 17, 19, the specific resistivity of the compositions at high temperatures is small. The Curie point of the compositions on the outside of the lines 6, 13 and 17 shifts toward high temperature side from practical range so that their dielectric constant becomes small, whereas on the outside of a line interconnecting points 19 and 2, Curie point shifts toward the low temperature side from the practical range, thereby decreasing the dielectric constant.

In the accompanying drawing, numerals designate the sample numbers shown in Table I.

EXAMPLE 2

In this example, to the ternary composition described above is added 0.02 to 3 atomic % of at least one auxiliary ingredient selected from Nb, Ta and Sb for the purpose of improving the mechanical strength.

In this example, lead oxide PbO, magnesium oxide MgO, tungsten oxide $WO_3$, titanium oxide $TiO_2$, nickel oxide NiO, niobium oxide $Nb_2O_5$, tantalum oxide $Ta_2O_5$ and antimony oxide $Sb_2O_3$ each having a purity of higher than 99.9%, were weighed to have a ratio of admixing as shown in Table II. After wet admixing the powders of the raw materials in a ball mill, the mixture was calcined at a temperature of 750° to 800° C., and then pulverized with the ball mill. After filtration and drying, an organic binder was put into the powder and pressed to obtain 4 circular discs each having a diameter of 16 mm and a thickness of about 2 mm. Further, a cylinder having a diameter of 16 mm and a height of 10 mm was formed.

The composition of this example was sintered in air for one hour at a temperature of 900° to 1050° C. Silver electrodes were bounded to the opposite surfaces of each disc and its capacitance and dielectric constant were measured at a frequency of 1 KHz, voltage of 1 Vr.m.s and at a temperature of 20° C. with a digital LCR meter to calculate the dielectric constant.

Then the insulating resistances at 20° C. and 125° C. were measured with a ultra insulating resistance meter in which a voltage of 50 V was applied for one minute for calculating the specific resistivity.

For the purpose of evaluating mechanical strength in terms of the bend strength, 10 rectangular pieces each having a thickness of 0.5 mm, a width of 2 mm and a length of about 13 mm were cut out from the sintered cylinder. A fracture load Pm (Kg) was measured by using two fulcrums spaced 9 mm and the bend strength $\tau(Kg/cm^2)$ was calculated according to an equation $$\tau = \frac{3}{2} \frac{Pml}{\omega t^2} (Kg/cm^2)$$

where l represents the spacing between fulcrums, t the thickness of the sample, and $\omega$ the width of the sample. The electric characteristics were determined from a mean value of 4 discs, while the bend strength were determined from an average value of 10 rectangular samples.

The ratios of ingredients x, y and z of the main compositions $[Pb(Mg_{\frac{1}{2}}W_{\frac{1}{2}})O_3]x[PbTiO_3]y[Pb(Ni_{\frac{1}{3}}Nb_{\frac{2}{3}})O_3]z$, the quantity of addition of the auxiliary compositions, dielectric constant, dielectric loss, the specific resistivity and bend strength at 20° C. and 125° C. are shown in the following Table II.

TABLE II

| Sample No. | No | Ratio of main ingredients (mol %) | | | Quantity of auxiliary ingredients | | Dielectric constant | Dielectric loss (%) | Specific resistivity at 20° C. (Ω·cm) | Specific resistivity at 125° C. (Ω·cm) | Bend strength (Kg/cm²) |
|---|---|---|---|---|---|---|---|---|---|---|---|
| | | Pb(Mg½W½)O₃ | PbTiO₃ | Pb(Ni⅓Nb⅔)O₃ | Additive element | Quantity (Atomic %) | | | | | |
| 1* | 1 | 60 | 10 | 50 | — | — | 420 | 0.0 | $8.3 \times 10^{12}$ | $9.7 \times 10^{11}$ | 560 |
| 2* | 2 | 69.3 | 29.7 | 1 | — | — | 3060 | 2.1 | $9.5 \times 10^{12}$ | $2.5 \times 10^{12}$ | 620 |
| 3 | " | " | " | " | Nb | 0.3 | 3210 | 2.0 | $1.7 \times 10^{13}$ | $4.5 \times 10^{12}$ | 1160 |
| 4 | " | " | " | " | Ta | 0.3 | 3170 | 2.3 | $1.3 \times 10^{13}$ | $3.4 \times 10^{12}$ | 1230 |
| 5* | 3 | 60 | 40 | — | — | — | 3990 | 3.3 | $9.3 \times 10^{11}$ | $8.2 \times 10^{9}$ | 600 |
| 6* | 4 | 57 | 38 | 5 | — | — | 6030 | 2.4 | $8.1 \times 10^{12}$ | $1.1 \times 10^{12}$ | 630 |
| 7 | " | " | " | " | Nb | 0.1 | 6150 | 2.5 | $9.3 \times 10^{12}$ | $1.7 \times 10^{12}$ | 1190 |
| 8 | " | " | " | " | " | 0.5 | 6390 | 2.8 | $9.7 \times 10^{12}$ | $2.0 \times 10^{12}$ | 1280 |
| 9 | " | " | " | " | Sb | " | 6310 | 2.7 | $9.5 \times 10^{12}$ | $1.3 \times 10^{12}$ | 1360 |
| 10* | 5 | 51 | 34 | 15 | — | — | 5320 | 0.8 | $1.2 \times 10^{12}$ | $1.6 \times 10^{12}$ | 650 |
| 11 | " | " | " | " | Nb | 0.02 | 5350 | 0.8 | $1.3 \times 10^{13}$ | $1.6 \times 10^{12}$ | 1050 |
| 12 | " | " | " | " | " | 0.5 | 5810 | 1.2 | $2.5 \times 10^{13}$ | $3.8 \times 10^{12}$ | 1410 |
| 13 | " | " | " | " | " | 3.0 | 5730 | 1.4 | $2.7 \times 10^{13}$ | $4.2 \times 10^{12}$ | 1010 |
| 14 | " | " | " | " | Ta | 0.02 | 5380 | 0.8 | $1.2 \times 10^{13}$ | $1.7 \times 10^{12}$ | 1000 |
| 15 | " | " | " | " | " | 0.5 | 5870 | 1.3 | $2.1 \times 10^{13}$ | $3.0 \times 10^{12}$ | 1310 |
| 16 | " | " | " | " | " | 3.0 | 5650 | 1.6 | $2.5 \times 10^{13}$ | $3.7 \times 10^{12}$ | 1070 |
| 17* | 6 | 49.5 | 49.5 | 1 | — | — | 4530 | 3.8 | $2.5 \times 10^{12}$ | $3.4 \times 10^{11}$ | 590 |
| 18 | " | " | " | " | Sb | 0.3 | 4850 | 4.1 | $4.1 \times 10^{12}$ | $5.6 \times 10^{11}$ | 1260 |
| 19 | " | " | " | " | Ta | 0.3 | 4780 | 3.9 | $3.7 \times 10^{12}$ | $5.4 \times 10^{11}$ | 1320 |
| 20* | 7 | 45 | 45 | 10 | — | — | 9230 | 3.7 | $5.6 \times 10^{12}$ | $6.3 \times 10^{11}$ | 630 |
| 21 | " | " | " | " | Nb | 0.1 | 9420 | 4.2 | $7.8 \times 10^{12}$ | $8.8 \times 10^{11}$ | 1150 |
| 22 | " | " | " | " | Nb | 0.5 | 9570 | 4.5 | $8.6 \times 10^{12}$ | $1.0 \times 10^{12}$ | 1330 |
| 23 | " | " | " | " | Ta | 0.5 | 9610 | 4.6 | $8.1 \times 10^{12}$ | $9.6 \times 10^{11}$ | 1380 |
| 24* | 8 | 40 | 40 | 20 | — | — | 7920 | 1.8 | $6.1 \times 10^{12}$ | $1.0 \times 10^{12}$ | 610 |
| 25 | " | " | " | " | Nb | 0.02 | 8050 | 1.7 | $6.4 \times 10^{12}$ | $1.0 \times 10^{12}$ | 990 |
| 26 | " | " | " | " | " | 0.5 | 8310 | 2.0 | $8.7 \times 10^{12}$ | $1.6 \times 10^{12}$ | 1310 |
| 27 | " | " | " | " | " | 1.0 | 8360 | 2.2 | $9.2 \times 10^{12}$ | $1.7 \times 10^{12}$ | 1150 |
| 28 | " | " | " | " | " | 3.0 | 8230 | 2.4 | $9.5 \times 10^{12}$ | $1.8 \times 10^{12}$ | 1060 |
| 29* | " | " | " | " | " | 5.0 | 8120 | 3.7 | $7.9 \times 10^{12}$ | $1.3 \times 10^{12}$ | 630 |
| 30 | " | " | " | " | Sb | 0.02 | 7970 | 1.8 | $6.7 \times 10^{12}$ | $1.1 \times 10^{12}$ | 1070 |
| 31 | " | " | " | " | Sb | 0.5 | 8270 | 2.1 | $9.1 \times 10^{12}$ | $1.7 \times 10^{12}$ | 1360 |
| 32 | " | " | " | " | Ta | 0.5 | 8330 | 2.0 | $8.3 \times 10^{12}$ | $1.3 \times 10^{12}$ | 1320 |
| 33 | " | " | " | " | Ta | 3.0 | 8290 | 2.6 | $8.7 \times 10^{12}$ | $1.5 \times 10^{12}$ | 1010 |
| 34* | 9 | 35 | 35 | 30 | — | — | 6790 | 1.0 | $8.2 \times 10^{12}$ | $6.8 \times 10^{11}$ | 580 |
| 35 | " | " | " | " | Sb | 0.1 | 6930 | 1.3 | $9.5 \times 10^{12}$ | $8.1 \times 10^{11}$ | 1190 |
| 36 | " | " | " | " | " | 1.0 | 7250 | 1.5 | $1.4 \times 10^{13}$ | $1.1 \times 10^{12}$ | 1130 |
| 37 | " | " | " | " | Ta | 0.1 | 6890 | 1.2 | $9.8 \times 10^{12}$ | $8.7 \times 10^{11}$ | 1210 |
| 38 | " | " | " | " | " | 1.0 | 7130 | 1.5 | $1.7 \times 10^{13}$ | $1.5 \times 10^{12}$ | 1150 |
| 39* | 10 | 23 | 42 | 30 | — | — | 7670 | 2.8 | $2.0 \times 10^{12}$ | $7.5 \times 10^{11}$ | 600 |
| 40 | " | " | " | " | Nb | 0.1 | 7830 | 3.2 | $2.7 \times 10^{12}$ | $1.0 \times 10^{12}$ | 1150 |
| 41 | " | " | " | " | " | 0.5 | 8020 | 3.4 | $3.2 \times 10^{12}$ | $1.3 \times 10^{12}$ | 1320 |
| 42 | " | " | " | " | Sb | 0.5 | 7980 | 3.3 | $2.9 \times 10^{12}$ | $1.2 \times 10^{12}$ | 1410 |
| 43 | " | " | " | " | " | 1.0 | 8150 | 3.7 | $3.7 \times 10^{12}$ | $1.6 \times 10^{12}$ | 1100 |
| 44* | 11 | 24 | 36 | 40 | — | — | 10530 | 1.8 | $5.5 \times 10^{12}$ | $4.3 \times 10^{11}$ | 570 |
| 45 | " | " | " | " | Nb | 0.02 | 10650 | 1.8 | $5.7 \times 10^{12}$ | $4.3 \times 10^{11}$ | 1010 |
| 46 | " | " | " | " | " | 0.1 | 11280 | 2.0 | $6.8 \times 10^{12}$ | $5.2 \times 10^{11}$ | 1130 |
| 47 | " | " | " | " | " | 0.5 | 11720 | 2.2 | $7.3 \times 10^{12}$ | $5.9 \times 10^{11}$ | 1320 |
| 48 | " | " | " | " | " | 1.0 | 12100 | 2.5 | $8.6 \times 10^{12}$ | $7.2 \times 10^{11}$ | 1160 |
| 49 | " | " | " | " | Nb | 3.0 | 11950 | 2.7 | $9.1 \times 10^{12}$ | $7.5 \times 10^{11}$ | 1050 |
| 50* | " | " | " | " | " | 5.0 | 11050 | 3.9 | $6.1 \times 10^{12}$ | $4.8 \times 10^{11}$ | 690 |
| 51 | " | " | " | " | Sb | 0.1 | 10970 | 1.9 | $7.1 \times 10^{12}$ | $5.2 \times 10^{11}$ | 1260 |
| 52 | " | " | " | " | " | 1.0 | 11820 | 2.4 | $8.9 \times 10^{12}$ | $7.1 \times 10^{11}$ | 1140 |
| 53 | " | " | " | " | " | 3.0 | 11280 | 2.8 | $9.7 \times 10^{12}$ | $8.1 \times 10^{11}$ | 1020 |
| 54 | " | " | " | " | Nb Sb Sb | 0.1 0.1 0.1 | 11320 | 2.1 | $6.8 \times 10^{12}$ | $5.1 \times 10^{11}$ | 1310 |
| 55 | 11 | 24 | 36 | 40 | Ta | 0.1 | 11060 | 2.0 | $7.5 \times 10^{12}$ | $5.7 \times 10^{11}$ | 1270 |
| 56* | 12 | 20 | 30 | 50 | — | 0.5 | 7980 | 0.5 | $6.8 \times 10^{12}$ | $1.7 \times 10^{11}$ | 630 |
| 57 | " | " | " | " | Nb | 0.1 | 8150 | 0.8 | $7.5 \times 10^{12}$ | $2.1 \times 10^{11}$ | 1120 |
| 58 | " | " | " | " | " | 0.5 | 8320 | 1.0 | $8.7 \times 10^{12}$ | $2.4 \times 10^{11}$ | 1350 |
| 59 | " | " | " | " | Ta | 0.5 | 8280 | 0.9 | $9.1 \times 10^{12}$ | $2.7 \times 10^{11}$ | 1380 |
| 60* | 13 | 19.5 | 45.5 | 35 | — | — | 3450 | 2.2 | $4.2 \times 10^{12}$ | $8.3 \times 10^{11}$ | 570 |
| 61 | " | " | " | " | Nb | 0.5 | 3720 | 2.5 | $6.7 \times 10^{12}$ | $1.3 \times 10^{12}$ | 1290 |
| 62 | " | " | " | " | Sb | 0.5 | 3750 | 2.7 | $6.1 \times 10^{12}$ | $1.2 \times 10^{12}$ | 1320 |
| 63* | 14 | 16.5 | 38.5 | 45 | — | — | 7200 | 2.4 | $3.7 \times 10^{12}$ | $3.8 \times 10^{11}$ | 610 |
| 64 | " | " | " | " | Nb | 0.1 | 7830 | 2.6 | $5.3 \times 10^{12}$ | $5.4 \times 10^{11}$ | 1180 |
| 65 | " | " | " | " | Nb | 1.0 | 8750 | 2.9 | $6.5 \times 10^{12}$ | $7.3 \times 10^{11}$ | 1120 |
| 66* | 15 | 13.5 | 31.5 | 55 | — | — | 11880 | 1.9 | $4.1 \times 10^{12}$ | $1.5 \times 10^{11}$ | 650 |
| 67 | " | " | " | " | Nb | 0.02 | 11950 | 2.0 | $4.2 \times 10^{12}$ | $1.5 \times 10^{11}$ | 1050 |
| 68 | " | " | " | " | " | 0.5 | 13210 | 2.3 | $6.5 \times 10^{12}$ | $2.4 \times 10^{11}$ | 1380 |
| 69 | " | " | " | " | " | 3.0 | 12870 | 3.5 | $7.1 \times 10^{12}$ | $2.7 \times 10^{11}$ | 1020 |
| 70 | " | " | " | " | Ta | 0.5 | 13090 | 2.2 | $6.8 \times 10^{12}$ | $2.6 \times 10^{11}$ | 1350 |
| 71* | 16 | 16 | 64 | 20 | — | — | 1030 | 2.5 | $1.3 \times 10^{12}$ | $7.3 \times 10^{10}$ | 540 |
| 72* | 17 | 10 | 40 | 50 | — | — | 5620 | 2.3 | $4.5 \times 10^{12}$ | $1.2 \times 10^{11}$ | 620 |
| 73 | " | " | " | " | Sb | 0.5 | 5950 | 2.7 | $5.9 \times 10^{12}$ | $1.7 \times 10^{11}$ | 1280 |
| 74 | " | " | " | " | Ta | 0.5 | 5870 | 2.6 | $6.1 \times 10^{12}$ | $1.8 \times 10^{11}$ | 1330 |

TABLE II-continued

| Sample No. | No | Ratio of main ingredients (mol %) | | | Quantity of auxiliary ingredients | | Dielectric constant | Dielectric loss (%) | Specific resistivity at 20° C. ($\Omega \cdot cm$) | Specific resistivity at 125° C. ($\Omega \cdot cm$) | Bend strength (Kg/cm$^2$) |
|---|---|---|---|---|---|---|---|---|---|---|---|
| | | $Pb(Mg_{\frac{1}{2}}W_{\frac{1}{2}})O_3$ | $PbTiO_3$ | $Pb(Ni_{\frac{1}{3}}Nb_{\frac{2}{3}})O_3$ | Additive element | Quantity (Atomic %) | | | | | |
| 75* | 18 | 8 | 32 | 60 | — | — | 13400 | 3.2 | $3.2 \times 10^{12}$ | $8.2 \times 10^{10}$ | 650 |
| 76 | " | " | " | " | Nb | 0.3 | 15120 | 3.8 | $5.2 \times 10^{12}$ | $1.2 \times 10^{11}$ | 1230 |
| 77 | " | " | " | " | Sb | 0.3 | 14870 | 3.9 | $5.8 \times 10^{12}$ | $1.3 \times 10^{11}$ | 1310 |
| 78* | 19 | 6 | 24 | 70 | — | — | 9250 | 0.3 | $2.8 \times 10^{12}$ | $4.3 \times 10^{10}$ | 610 |
| 79 | " | " | " | " | Nb | 0.3 | 9570 | 0.5 | $4.7 \times 10^{12}$ | $6.1 \times 10^{10}$ | 1320 |
| 80 | " | " | " | " | Ta | 0.3 | 9610 | 0.7 | $4.1 \times 10^{12}$ | $5.8 \times 10^{10}$ | 1290 |
| 81* | 20 | 4 | 36 | 60 | — | — | 14500 | 0.8 | $6.5 \times 10^{11}$ | $4.5 \times 10^{9}$ | 590 |

Remarks:
Samples marked with symbol * are basic compositions.

As can be noted from this table, the ternary ceramic composition of this invention consisting of the $Pb(Mg_{\frac{1}{2}}W_{\frac{1}{2}})O_3-PbTiO_3-Pb(Ni_{\frac{1}{3}}Nb_{\frac{2}{3}})O_3$ and added with at least one auxiliary constituent element selected from the group consisting of Nb, Ta and Sb has a high dielectric constant of 3170 to 15120, a small dielectric loss of only 0.5 to 4.6%, a high specific resistivity of $2.7 \times 10^{12}$ to $2.7 \times 10^{13}$ at 20° C. and $5.8 \times 10^{10}$ to $3.5 \times 10^{12}$ ohm cm even at 125° C., and a sufficiently high bend strength of 990 to 1410 Kg/cm$^2$, which means that the ceramic composition of this invention has high reliability and utility.

Since this example also has a low sintering temperature of less than 1050° C., the internal electrodes of the laminated capacitor can be made of low cost materials.

The quantity of addition of the auxiliary constituent element is limited to 0.02 to 3 atomic percent based on the main composition. In regions on the outside of lines interconnection points 2 and 6 and points 17 and 19, the specific resistivity of the compositions at high temperatures is small. The Curie point of the compositions on the outside of the lines 6, 13 and 17 shifts toward high temperature side from practical range so that their dielectric constant becomes small, whereas on the outside of a line interconnecting points 19 and 2, Curie point shifts toward the low temperature side from the practical range, thereby decreasing the dielectric constant.

When the quantity of one or more of the auxiliary ingradients Nb, Ta and Sb is less than 0.02 atomic %, the bend strength can not be improved as desired, whereas when this quantity exceeds 3 atomic %, the bend strength decreases.

EXAMPLE 3

In this example, 0.05 to 8 mol % of lead manganese tantalate $Pb(Mn_{\frac{1}{3}}Ta_{\frac{2}{3}})O_3$ is used as the auxiliary component for the purpose of improving the mechanical strength of the ceramic composition of Example 1.

More particularly, lead oxide (PbO) magnesium oxide (MgO), tungsten oxide $WO_3$, titanium oxide ($TiO_2$), nickel oxide NiO, niobium oxide ($Nb_2O_5$), tantalum oxide ($Ta_2O_5$) and manganese carbonate ($MnCO_3$), each having a purity of higher than 99.9%, were used as raw materials and weighed to form a ratio of ingredients as shown in the following Table III. The weighed raw materials were wet admixed in a ball mill and calcined at a temperature of 750° to 800° C. The calcined mixture was pulverized with a ball mill. After filtration and drying, an organic binder was put inyo the powder and pressed into 4 circular discs each having a diameter of 16 mm and a thickness of about 2 mm and into a cylinder having a diameter of 16 mm and a thickness of 10 mm in the same manner as in Example 2. These samples were then sintered in air at a temperature of 900° to 1050° C. Silver electrodes were bonded to the opposite surfaces of each sintered disc and the dielectric constant was calculated by measuring the dielectric loss under the same conditions and with the same meter as in Examples 1 and 2. Then, the insulating resistance was measured by applying 50 V for one minute at temperatures of 20° C. and 125° C. to calculate the specific resistivity.

The mechanical strength was measured by measuring the bend strength just in the same manner as in Example 2, and the electrical characteristics were also determined in the same manner as in Example 2.

The ratios of ingredients x, y, z of the main ceramic composition $[Pb(Mg_{\frac{1}{2}}W_{\frac{1}{2}})O_3]x[PbTiO_3]y[Pb(Ni_{\frac{1}{3}}Nb_{\frac{2}{3}})O_3]z$, the quantity of the auxiliary components, dielectric constant, dielectric loss, the specific resistivity at 20° C. and 125° C., and the bend strength are shown in the following Table III.

TABLE III

| Sample No. | No | Ratio of main ingredients (mol %) | | | Additive quantity of auxiliary ingredients (mol %) | Dielectric constant | Dielectric loss (%) | Specific resistivity at 20° C. ($\Omega \cdot cm$) | Specific resistivity at 125° C. ($\Omega \cdot cm$) | Bend strength (Kg/cm$^2$) |
|---|---|---|---|---|---|---|---|---|---|---|
| | | $Pb(Mg_{\frac{1}{2}}W_{\frac{1}{2}})O_3$ | $PbTiO_3$ | $Pb(Ni_{\frac{1}{3}}Nb_{\frac{2}{3}})O_3$ | $Pb(Mn_{\frac{1}{3}}Ta_{\frac{2}{3}})O_3$ | | | | | |
| 1* | 1 | 40 | 10 | 50 | — | 420 | 0.1 | $8.3 \times 10^{12}$ | $9.7 \times 10^{11}$ | 560 |
| 2* | 2 | 69.3 | 29.7 | 1 | — | 3060 | 2.0 | $9.5 \times 10^{12}$ | $2.5 \times 10^{12}$ | 620 |
| 3 | " | " | " | " | 2.0 | 2930 | 0.6 | $1.2 \times 10^{12}$ | $3.4 \times 10^{12}$ | 1280 |
| 4* | 3 | 60 | 40 | — | — | 3990 | 3.3 | $9.3 \times 10^{12}$ | $8.2 \times 10^{9}$ | 600 |
| 5* | 4 | 57 | 38 | 5 | — | 6030 | 2.4 | $8.1 \times 10^{12}$ | $1.1 \times 10^{12}$ | 630 |
| 6 | " | " | " | " | 0.1 | 6060 | 1.9 | $8.9 \times 10^{12}$ | $1.2 \times 10^{12}$ | 1110 |
| 7 | " | " | " | " | 2.0 | 5860 | 1.0 | $9.6 \times 10^{12}$ | $1.4 \times 10^{12}$ | 1350 |
| 8* | 5 | 51 | 34 | 15 | — | 5320 | 0.8 | $1.2 \times 10^{12}$ | $1.5 \times 10^{12}$ | 650 |
| 9 | " | " | " | " | 0.05 | 5430 | 0.7 | $1.3 \times 10^{12}$ | $1.7 \times 10^{12}$ | 1020 |
| 10 | " | " | " | " | 0.5 | 5360 | 0.5 | $1.4 \times 10^{12}$ | $1.9 \times 10^{12}$ | 1230 |
| 11 | " | " | " | " | 5.0 | 5090 | 0.5 | $1.6 \times 10^{12}$ | $2.2 \times 10^{12}$ | 1120 |
| 12 | " | " | " | " | 10.0 | 4820 | 1.1 | $8.3 \times 10^{12}$ | $1.0 \times 10^{12}$ | 1060 |
| 13* | 6 | 49.5 | 49.5 | 1 | — | 4530 | 3.8 | $2.5 \times 10^{12}$ | $3.4 \times 10^{11}$ | 590 |

TABLE III-continued

| Sample No. | Ratio of main ingredients (mol %) | | | | Additive quantity of auxiliary ingredients (mol %) | Dielectric constant | Dielectric loss (%) | Specific resistivity at 20° C. (Ω · cm) | Specific resistivity at 125° C. (Ω · cm) | Bend strength (Kg/cm²) |
|---|---|---|---|---|---|---|---|---|---|---|
| | No | Pb(Mg½W½)O₃ | PbTiO₃ | Pb(Ni⅓Nb⅔)O₃ | Pb(Mn⅓Ta⅔)O₃ | | | | | |
| 14 | " | " | " | " | 2.0 | 4360 | 2.4 | $3.1 \times 10^{12}$ | $4.1 \times 10^{11}$ | 1290 |
| 15* | 7 | 45 | 45 | 10 | — | 9230 | 3.7 | $5.6 \times 10^{12}$ | $6.3 \times 10^{11}$ | 630 |
| 16 | " | " | " | " | 0.1 | 9310 | 3.1 | $6.1 \times 10^{12}$ | $7.1 \times 10^{11}$ | 1080 |
| 17 | " | " | " | " | 2.0 | 8870 | 2.5 | $6.7 \times 10^{12}$ | $8.0 \times 10^{11}$ | 1380 |
| 18* | 8 | 40 | 40 | 20 | — | 7920 | 1.8 | $6.1 \times 10^{12}$ | $1.0 \times 10^{12}$ | 610 |
| 19 | " | " | " | " | 0.05 | 8130 | 1.6 | $6.3 \times 10^{12}$ | $1.1 \times 10^{12}$ | 1060 |
| 20 | " | " | " | " | 0.5 | 7990 | 1.1 | $6.9 \times 10^{12}$ | $1.3 \times 10^{12}$ | 1250 |
| 21 | " | " | " | " | 1.0 | 7850 | 0.7 | $7.6 \times 10^{12}$ | $1.4 \times 10^{12}$ | 1410 |
| 22 | " | " | " | " | 5.0 | 7580 | 0.9 | $7.3 \times 10^{12}$ | $1.2 \times 10^{12}$ | 1190 |
| 23 | " | " | " | " | 10.0 | 7120 | 2.0 | $4.5 \times 10^{12}$ | $7.1 \times 10^{11}$ | 1010 |
| 24* | " | " | " | " | 15.0 | 6750 | 2.7 | $2.1 \times 10^{12}$ | $4.7 \times 10^{11}$ | 690 |
| 25* | 9 | 35 | 35 | 30 | — | 6790 | 1.0 | $8.2 \times 10^{12}$ | $6.8 \times 10^{11}$ | 580 |
| 26 | " | " | " | " | 0.1 | 6850 | 0.8 | $8.4 \times 10^{12}$ | $6.9 \times 10^{11}$ | 1090 |
| 27 | " | " | " | " | 2.0 | 6530 | 0.6 | $9.7 \times 10^{12}$ | $8.8 \times 10^{11}$ | 1280 |
| 28* | 10 | 28 | 42 | 30 | — | 7670 | 2.8 | $2.0 \times 10^{12}$ | $7.5 \times 10^{11}$ | 600 |
| 29 | " | " | " | " | 0.1 | 7730 | 2.3 | $2.1 \times 10^{12}$ | $7.8 \times 10^{11}$ | 1130 |
| 30 | " | " | " | " | 2.0 | 7350 | 1.6 | $2.9 \times 10^{12}$ | $1.1 \times 10^{12}$ | 1350 |
| 31* | 11 | 24 | 36 | 40 | — | 10530 | 1.8 | $5.5 \times 10^{12}$ | $4.3 \times 10^{11}$ | 570 |
| 32 | " | " | " | " | 0.05 | 10830 | 1.7 | $5.8 \times 10^{12}$ | $4.9 \times 10^{11}$ | 990 |
| 33 | " | " | " | " | 0.5 | 10620 | 1.3 | $6.1 \times 10^{12}$ | $5.3 \times 10^{11}$ | 1200 |
| 34 | " | " | " | " | 1.0 | 10460 | 0.8 | $6.8 \times 10^{12}$ | $6.3 \times 10^{11}$ | 1360 |
| 35 | " | " | " | " | 5.0 | 10090 | 1.0 | $6.3 \times 10^{12}$ | $5.8 \times 10^{11}$ | 1130 |
| 36 | " | " | " | " | 10.0 | 9480 | 2.2 | $4.1 \times 10^{12}$ | $3.0 \times 10^{11}$ | 1030 |
| 37* | " | " | " | " | 15.0 | 8950 | 2.8 | $1.7 \times 10^{12}$ | $1.5 \times 10^{11}$ | 610 |
| 38* | 12 | 20 | 30 | 50 | — | 7980 | 0.5 | $6.8 \times 10^{12}$ | $1.7 \times 10^{11}$ | 630 |
| 39 | " | " | " | " | 0.1 | 8040 | 0.4 | $7.3 \times 10^{12}$ | $1.8 \times 10^{11}$ | 1080 |
| 40 | " | " | " | " | 2.0 | 7710 | 0.3 | $7.8 \times 10^{12}$ | $2.5 \times 10^{11}$ | 1430 |
| 41* | 13 | 19.5 | 45.5 | 35 | — | 3450 | 2.2 | $4.2 \times 10^{12}$ | $8.3 \times 10^{11}$ | 570 |
| 42 | " | " | " | " | 2.0 | 3370 | 1.3 | $5.7 \times 10^{12}$ | $1.3 \times 10^{12}$ | 1250 |
| 43* | 14 | 16.5 | 38.5 | 45 | — | 7200 | 2.4 | $3.7 \times 10^{12}$ | $3.8 \times 10^{11}$ | 610 |
| 44 | " | " | " | " | 2.0 | 7030 | 1.6 | $4.5 \times 10^{12}$ | $4.9 \times 10^{11}$ | 1360 |
| 45* | 15 | 13.5 | 31.5 | 55 | — | 11880 | 1.9 | $4.1 \times 10^{12}$ | $1.5 \times 10^{11}$ | 650 |
| 46 | " | " | " | " | 0.05 | 12270 | 1.7 | $4.3 \times 10^{12}$ | $1.7 \times 10^{11}$ | 1050 |
| 47 | " | " | " | " | 0.5 | 12010 | 1.4 | $5.7 \times 10^{12}$ | $2.3 \times 10^{11}$ | 1280 |
| 48 | " | " | " | " | 5.0 | 11330 | 1.2 | $5.1 \times 10^{12}$ | $2.2 \times 10^{11}$ | 1210 |
| 49 | " | " | " | " | 10.0 | 10510 | 2.4 | $2.8 \times 10^{12}$ | $9.5 \times 10^{10}$ | 1030 |
| 50* | 16 | 16 | 64 | 20 | — | 1030 | 2.5 | $1.3 \times 10^{12}$ | $7.3 \times 10^{10}$ | 540 |
| 51* | 17 | 10 | 40 | 50 | — | 5620 | 2.3 | $4.5 \times 10^{12}$ | $1.2 \times 10^{11}$ | 620 |
| 52 | " | " | " | " | 2.0 | 5410 | 1.6 | $5.8 \times 10^{12}$ | $2.0 \times 10^{11}$ | 1310 |
| 53* | 18 | 8 | 32 | 60 | — | 13400 | 3.2 | $3.2 \times 10^{12}$ | $8.2 \times 10^{10}$ | 650 |
| 54 | " | " | " | " | 2.0 | 13060 | 2.4 | $4.7 \times 10^{12}$ | $1.3 \times 10^{11}$ | 1330 |
| 55* | 19 | 6 | 24 | 70 | — | 9250 | 0.3 | $2.8 \times 10^{12}$ | $4.3 \times 10^{10}$ | 610 |
| 56 | " | " | " | " | 2.0 | 8920 | 0.2 | $4.2 \times 10^{12}$ | $8.3 \times 10^{10}$ | 1280 |
| 57* | 20 | 4 | 36 | 60 | — | 14500 | 0.8 | $6.5 \times 10^{11}$ | $4.5 \times 10^{9}$ | 590 |

Remarks:
Samples marked with symbol * are basic compositions.

As can be noted from this Table, the ternary ceramic composition of this example consisting of Pb(Mg½W½)O₃–PbTiO₃–Pb(Ni⅓Nb⅔)O₃ and Pb(Mn⅓Ta⅔)O₃ has a high dielectric constant of 3090 to 13510, a small dielectric loss of 0.3 to 3.1%, a high specific resistivity of $3.5 \times 10^{12}$ to $2.1 \times 10^{13}$ ohm cm, and a sufficiently high bend strength of 980 to 1410 Kg/cm². The low sintering temperature of less than 1050° C. also results in the same advantageous results as in the foregoing Examples.

The quantity of the auxiliary component Pb(Mn⅓Ta⅔)O₃ should be limited in a range of 0.05 to 8 mol % because, the regions on the outside of lines interconnecting points 2 and 6, and 17 and 19, the specific resistivity decreases at high temperatures. Further, in regions on the outside of lines interconnecting points 6, 13 and 17 the Curie point shifts greatly toward the high temperature side, thus reducing the dielectric constant, whereas in a region on the outside of a line interconnecting points 19 and 2, the Curie point shifts toward the low temperature side, thus reducing the dielectric constant.

When the quantity of addition of the auxiliary composition Pb(Mn⅓Ta⅔)O₃ is less than 0.05 mol %, the bend strength can not be improved as desired, whereas with a quantity exceeding 8 mol %, the bend strength decreases.

EXAMPLE 4

In this example, 0.05 to 10 mol % of lead manganese niobate [Pb(Mn⅓Nb⅔)O₃] was added to the ternary composition of Example 1 as the auxiliary ingredient for the purpose of improving the mechanical strength.

More particularly, powders of lead oxide PbO, magnesium oxide MgO, tungsten oxide WO₃, titanium oxide TiO₂, nickel oxide NiO, niobium oxide Nb₂O₅, and manganese carbonate MnCO₃, each having a purity of higher than 99.9%, where weighed to form a ratio of ingredients as shown in the following Table IV, the weighed materials were wet admixed with a ball mill, then calcined at a temperature of 750° to 800° C. Then the calcined mixture was pulverized with a ball mill. After filtration and drying, an organic binder was put into the powder and pressed into 4 circular discs each having a diameter of 16 mm and a thickness of about 2 mm and into a cylinder having a diameter of 16 mm and a height of about 10 mm. These samples were sintered in air at a temperature of 900° to 1050° C. for one hour. The dielectric constant, the mechanical strength, and the specific resistivity at 20° C. and 125° C. were measured just in the same manner as in Examples 2 and 3. The ratios of ingredients x, y and z of the main ternary ceramic composition $[Pb(Mg_{\frac{1}{2}}W_{\frac{1}{2}})O_3]x[PbTiO_3]y[Pb(Ni_{\frac{1}{3}}Nb_{\frac{2}{3}})O_3]z$, the quantity of the auxiliary composition, dielectric constant, dielectric loss, specific resistivity at 20° C. and 125° C. and the bend strength are shown in the following Table IV.

13060, a low dielectric loss of 0.2 to 3.1%, a high specific resistivity of $2.1 \times 10^{12}$ to $1.6 \times 10^{13}$ ohm. cm at 20° C. and $8.3 \times 10^{10}$ to $3.4 \times 10^{12}$ ohm.cm even at a high temperature of 125° C., and a high bend strength of 990 to 1430 Kg/cm². In this Example, too, since the sintering temperature is below 1050° C., the same advantages as in the foregoing Examples can be realized. The reason for limiting the quantity of the auxiliary component $Pb(Mn_{\frac{1}{3}}Nb_{\frac{2}{3}})O_3$ to be in a range of 0.05 to 10 mol % lies in that in regions on the outside of lines interconnecting

TABLE IV

| Sample No. | No | Ratio of main ingredients (mol %) Pb(Mg₁W₁)O₃ | PbTiO₃ | Pb(Ni₁Nb₂)O₃ | Additive quantity of auxiliary ingredients (mol %) Pb(Mn₁Nb₂)O₃ | Dielectric constant | Dielectric loss (%) | Specific resistivity at 20° C. (Ω·cm) | Specific resistivity at 125° C. (Ω·cm) | Bend strength (Kg/cm²) |
|---|---|---|---|---|---|---|---|---|---|---|
| 1* | 1 | 40 | 10 | 50 | — | 420 | 0.1 | $8.3 \times 10^{12}$ | $9.7 \times 10^{11}$ | 560 |
| 2* | 2 | 69.3 | 29.7 | 1 | — | 3060 | 2.0 | $9.5 \times 10^{12}$ | $2.5 \times 10^{12}$ | 620 |
| 3 | " | " | " | " | 2.0 | 2930 | 0.6 | $1.2 \times 10^{12}$ | $3.4 \times 10^{12}$ | 1280 |
| 4* | 3 | 60 | 40 | — | — | 3990 | 3.3 | $9.3 \times 10^{11}$ | $8.2 \times 10^{9}$ | 600 |
| 5* | 4 | 57 | 38 | 5 | — | 6030 | 2.4 | $8.1 \times 10^{12}$ | $1.1 \times 10^{12}$ | 630 |
| 6 | " | " | " | " | 0.1 | 6060 | 1.9 | $8.9 \times 10^{12}$ | $1.2 \times 10^{12}$ | 1110 |
| 7 | " | " | " | " | 2.0 | 5860 | 1.0 | $9.6 \times 10^{12}$ | $1.4 \times 10^{12}$ | 1350 |
| 8* | 5 | 51 | 34 | 15 | — | 5320 | 0.8 | $1.2 \times 10^{12}$ | $1.6 \times 10^{12}$ | 650 |
| 9 | " | " | " | " | 0.05 | 5430 | 0.7 | $1.3 \times 10^{12}$ | $1.7 \times 10^{12}$ | 1020 |
| 10 | " | " | " | " | 0.5 | 5360 | 0.5 | $1.4 \times 10^{12}$ | $1.9 \times 10^{12}$ | 1230 |
| 11 | " | " | " | " | 5.0 | 5090 | 0.5 | $1.6 \times 10^{12}$ | $2.2 \times 10^{12}$ | 1120 |
| 12 | " | " | " | " | 10.0 | 4820 | 1.1 | $8.3 \times 10^{12}$ | $1.0 \times 10^{12}$ | 1060 |
| 13* | 6 | 49.5 | 49.5 | 1 | — | 4530 | 3.8 | $2.5 \times 10^{12}$ | $3.4 \times 10^{11}$ | 590 |
| 14 | " | " | " | " | 2.0 | 4360 | 2.4 | $3.1 \times 10^{12}$ | $4.1 \times 10^{11}$ | 1290 |
| 15* | 7 | 45 | 45 | 10 | — | 9230 | 3.7 | $5.6 \times 10^{12}$ | $6.3 \times 10^{11}$ | 630 |
| 16 | " | " | " | " | 0.1 | 9310 | 3.1 | $6.1 \times 10^{12}$ | $7.1 \times 10^{11}$ | 1080 |
| 17 | " | " | " | " | 2.0 | 8870 | 2.5 | $6.7 \times 10^{12}$ | $8.0 \times 10^{11}$ | 1380 |
| 18* | 8 | 40 | 40 | 20 | — | 7920 | 1.8 | $6.1 \times 10^{12}$ | $1.0 \times 10^{12}$ | 610 |
| 19 | " | " | " | " | 0.05 | 8130 | 1.6 | $6.3 \times 10^{12}$ | $1.1 \times 10^{12}$ | 1060 |
| 20 | " | " | " | " | 0.5 | 7990 | 1.1 | $6.9 \times 10^{12}$ | $1.3 \times 10^{12}$ | 1250 |
| 21 | " | " | " | " | 1.0 | 7850 | 0.7 | $7.6 \times 10^{12}$ | $1.4 \times 10^{12}$ | 1410 |
| 22 | " | " | " | " | 5.0 | 7580 | 0.9 | $7.3 \times 10^{12}$ | $1.2 \times 10^{12}$ | 1190 |
| 23 | " | " | " | " | 10.0 | 7120 | 2.0 | $4.5 \times 10^{12}$ | $7.1 \times 10^{11}$ | 1010 |
| 24* | " | " | " | " | 15.0 | 6750 | 2.7 | $2.1 \times 10^{12}$ | $4.7 \times 10^{11}$ | 690 |
| 25* | 9 | 35 | 35 | 30 | — | 6790 | 1.0 | $8.2 \times 10^{12}$ | $6.8 \times 10^{11}$ | 580 |
| 26 | " | " | " | " | 0.1 | 6850 | 0.8 | $8.4 \times 10^{12}$ | $6.9 \times 10^{11}$ | 1090 |
| 27 | " | " | " | " | 2.0 | 6530 | 0.6 | $9.7 \times 10^{12}$ | $8.8 \times 10^{11}$ | 1280 |
| 28* | 10 | 28 | 42 | 30 | — | 7670 | 2.8 | $2.0 \times 10^{12}$ | $7.5 \times 10^{11}$ | 600 |
| 29 | " | " | " | " | 0.1 | 7730 | 2.3 | $2.1 \times 10^{12}$ | $7.8 \times 10^{11}$ | 1130 |
| 30 | " | " | " | " | 2.0 | 7350 | 1.6 | $2.9 \times 10^{12}$ | $1.1 \times 10^{12}$ | 1350 |
| 31* | 11 | 24 | 36 | 40 | — | 10530 | 1.8 | $5.5 \times 10^{12}$ | $4.3 \times 10^{11}$ | 570 |
| 32 | " | " | " | " | 0.05 | 10830 | 1.7 | $5.8 \times 10^{12}$ | $4.9 \times 10^{11}$ | 990 |
| 33 | " | " | " | " | 0.5 | 10620 | 1.3 | $6.1 \times 10^{12}$ | $5.3 \times 10^{11}$ | 1200 |
| 34 | " | " | " | " | 1.0 | 10460 | 0.3 | $6.8 \times 10^{12}$ | $6.3 \times 10^{11}$ | 1360 |
| 35 | " | " | " | " | 5.0 | 10090 | 1.0 | $6.3 \times 10^{12}$ | $5.8 \times 10^{11}$ | 1130 |
| 36 | " | " | " | " | 10.0 | 9480 | 2.2 | $4.1 \times 10^{12}$ | $3.0 \times 10^{11}$ | 1030 |
| 37* | " | " | " | " | 15.0 | 8950 | 2.8 | $1.7 \times 10^{12}$ | $1.5 \times 10^{11}$ | 610 |
| 38* | 12 | 20 | 30 | 50 | — | 7980 | 0.5 | $6.8 \times 10^{12}$ | $1.7 \times 10^{11}$ | 630 |
| 39 | " | " | " | " | 0.1 | 8040 | 0.4 | $7.3 \times 10^{12}$ | $1.8 \times 10^{11}$ | 1080 |
| 40 | " | " | " | " | 2.0 | 7710 | 0.3 | $7.8 \times 10^{12}$ | $2.5 \times 10^{11}$ | 1430 |
| 41* | 13 | 19.5 | 45.5 | 35 | — | 3450 | 2.2 | $4.2 \times 10^{12}$ | $8.3 \times 10^{11}$ | 570 |
| 42 | " | " | " | " | 2.0 | 3370 | 1.3 | $5.7 \times 10^{12}$ | $1.3 \times 10^{11}$ | 1250 |
| 43* | 14 | 16.5 | 38.5 | 45 | — | 7200 | 2.4 | $3.7 \times 10^{12}$ | $3.8 \times 10^{11}$ | 610 |
| 44 | " | " | " | " | 2.0 | 7030 | 1.6 | $4.5 \times 10^{12}$ | $4.9 \times 10^{11}$ | 1360 |
| 45* | 15 | 13.5 | 31.5 | 55 | — | 11880 | 1.9 | $4.1 \times 10^{12}$ | $1.5 \times 10^{11}$ | 650 |
| 46 | " | " | " | " | 0.05 | 12270 | 1.7 | $4.3 \times 10^{12}$ | $1.7 \times 10^{11}$ | 1050 |
| 47 | " | " | " | " | 0.5 | 12010 | 1.4 | $5.7 \times 10^{12}$ | $2.3 \times 10^{11}$ | 1280 |
| 48 | " | " | " | " | 5.0 | 11330 | 1.2 | $5.1 \times 10^{12}$ | $2.2 \times 10^{11}$ | 1210 |
| 49 | " | " | " | " | 10.0 | 10510 | 2.4 | $2.8 \times 10^{12}$ | $9.5 \times 10^{10}$ | 1030 |
| 50* | 16 | 16 | 64 | 20 | — | 1030 | 2.5 | $1.3 \times 10^{12}$ | $7.3 \times 10^{10}$ | 540 |
| 51* | 17 | 10 | 40 | 50 | — | 5620 | 2.3 | $4.5 \times 10^{12}$ | $1.2 \times 10^{11}$ | 620 |
| 52 | " | " | " | " | 2.0 | 5410 | 1.6 | $5.8 \times 10^{12}$ | $2.0 \times 10^{11}$ | 1310 |
| 53* | 18 | 8 | 32 | 60 | — | 13400 | 3.2 | $3.2 \times 10^{12}$ | $8.2 \times 10^{10}$ | 650 |
| 54 | " | " | " | " | 2.0 | 13060 | 2.4 | $4.7 \times 10^{12}$ | $1.3 \times 10^{11}$ | 1330 |
| 55* | 19 | 6 | 24 | 70 | — | 9250 | 0.3 | $2.8 \times 10^{12}$ | $4.3 \times 10^{10}$ | 610 |
| 56 | " | " | " | " | 2.0 | 8920 | 0.2 | $4.2 \times 10^{12}$ | $8.3 \times 10^{10}$ | 1280 |
| 57* | 20 | 4 | 36 | 60 | — | 14500 | 0.8 | $6.5 \times 10^{11}$ | $4.5 \times 10^{9}$ | 590 |

Remarks:
Samples marked with symbol * are basic compositions.

As can be noted from this Table IV, the ternary ceramic composition of this invention consisting of $Pb(Mg_{\frac{1}{2}}W_{\frac{1}{2}})O_3-PbTiO_2-Pb(Ni_{\frac{1}{3}}Nb_{\frac{2}{3}})O_3$ and $Pb(Mn_{\frac{1}{3}}Nb_{\frac{2}{3}})O_3$ has a high dielectric constant of 2930 to points 2 and 6 and points 17 and 19, the specific resistivity decreases at high temperatures, that in the region on the outside of lines interconnecting points 6, 13 and 17, the Curie point shifts greatly toward the high temperature side, thereby decreasing the dielectric constant, and that in a region on the outside of a line interconnecting points 19 and 2, the Curie point shifts greatly toward the low temperature side, thus decreasing the dielectric constant. Less than 0.05 mol % of $Pb(Mn_{\frac{1}{3}}Nb_{\frac{2}{3}})O_3$ can not improve the bend strength as desired whereas more than 10 mol % of the auxiliary ingredient decreases the bend strength.

EXAMPLE 5

In this Example, 0.05 to 6 mol % of lead manganese antimonate $Pb(Mn_{\frac{1}{3}}Sb_{\frac{2}{3}})O_3$ is added to the basic ternary ceramic composition of Example 1 for the purpose of improving the mechanical strength.

More particularly, in this example, powders of lead oxide PbO, magnesium oxide MgO, tungsten oxide $WO_3$, titanium oxide $TiO_2$, nickel oxide NiO, niobium oxide $Nb_2O_5$, antimony oxide $Sb_2O_3$, and manganese carbonate $MnCO_3$ were weighed to have a composition ratio as shown in the following Table V. Thereafter, samples in the form of circular discs and a cylinder were prepared and sintered in air at a temperature of 900° C. to 1050° C. in the same manner as in Examples 2, 3 and 4, and their dielectric constant, specific resistivity at 20° C. and 125° C., and mechanical strength that is the bend strength were determined in the same manner.

The ratio x, y and z of the main composition $[Pb(Mg_{\frac{1}{2}}W_{\frac{1}{2}})O_3]x[PbTiO_3]y[Pb(Ni_{\frac{1}{3}}Nb_{\frac{2}{3}})O_3]z$, the quantity of the auxiliary component $Pb(Mn_{\frac{1}{3}}Sb_{\frac{2}{3}})O_3$, dielectric constant, dielectric loss, specific resistivity at 20° C. and 125° C. and the bend strength are shown in the following Table V.

TABLE V

| Sample No. | No | Ratio of main ingredients (mol %) | | | Additive quantity of auxiliary ingredients (mol %) | Dielectric constant | Dielectric loss (%) | Specific resistivity at 20° C. (Ω · cm) | Specific resistivity at 125° C. (Ω · cm) | Bend strength (Kg/cm²) |
|---|---|---|---|---|---|---|---|---|---|---|
| | | $Pb(Mg_{\frac{1}{2}}W_{\frac{1}{2}})O_3$ | $PbTiO_3$ | $Pb(Ni_{\frac{1}{3}}Nb_{\frac{2}{3}})O_3$ | $Pb(Mn_{\frac{1}{3}}Sb_{\frac{2}{3}})O_3$ | | | | | |
| 1* | 1 | 40 | 10 | 50 | — | 420 | 0.1 | $8.3 \times 10^{12}$ | $9.7 \times 10^{11}$ | 560 |
| 2* | 2 | 69.3 | 29.7 | 1 | — | 3060 | 2.0 | $9.5 \times 10^{12}$ | $2.5 \times 10^{12}$ | 620 |
| 3 | " | " | " | " | 1.0 | 2950 | 0.9 | $1.4 \times 10^{12}$ | $3.8 \times 10^{12}$ | 1390 |
| 4* | 3 | 60 | 40 | — | — | 3990 | 3.3 | $9.3 \times 10^{11}$ | $8.2 \times 10^{9}$ | 600 |
| 5* | 4 | 57 | 38 | 5 | — | 6030 | 2.4 | $8.1 \times 10^{12}$ | $1.1 \times 10^{12}$ | 630 |
| 6 | " | " | " | " | 0.1 | 6180 | 1.6 | $9.6 \times 10^{12}$ | $1.4 \times 10^{12}$ | 1300 |
| 7 | " | " | " | " | 1.0 | 5790 | 1.3 | $9.3 \times 10^{12}$ | $1.3 \times 10^{12}$ | 1280 |
| 8* | 5 | 51 | 34 | 15 | — | 5320 | 0.8 | $1.2 \times 10^{12}$ | $1.6 \times 10^{12}$ | 650 |
| 9 | " | " | " | " | 0.05 | 5380 | 0.7 | $1.4 \times 10^{12}$ | $1.9 \times 10^{12}$ | 1030 |
| 10 | " | " | " | " | 0.5 | 5300 | 0.6 | $1.7 \times 10^{12}$ | $2.4 \times 10^{12}$ | 1350 |
| 11 | " | " | " | " | 3.0 | 5070 | 0.6 | $1.3 \times 10^{12}$ | $1.9 \times 10^{12}$ | 1210 |
| 12 | " | " | " | " | 6.0 | 4750 | 1.3 | $7.6 \times 10^{12}$ | $9.4 \times 10^{11}$ | 1000 |
| 13 | 6 | 49.5 | 49.5 | 1 | — | 4530 | 3.8 | $2.5 \times 10^{12}$ | $3.4 \times 10^{11}$ | 590 |
| 14 | " | " | " | " | 1.0 | 4460 | 2.6 | $3.9 \times 10^{12}$ | $5.9 \times 10^{11}$ | 1250 |
| 15 | 7 | 45 | 45 | 10 | — | 9230 | 3.7 | $5.6 \times 10^{12}$ | $6.3 \times 10^{11}$ | 630 |
| 16 | " | " | " | " | 0.1 | 9350 | 2.8 | $7.3 \times 10^{12}$ | $8.8 \times 10^{11}$ | 1330 |
| 17 | " | " | " | " | 1.0 | 9080 | 2.3 | $6.5 \times 10^{12}$ | $8.2 \times 10^{11}$ | 1280 |
| 18* | 8 | 40 | 40 | 20 | — | 7920 | 1.8 | $6.1 \times 10^{12}$ | $1.0 \times 10^{12}$ | 610 |
| 19 | " | " | " | " | 0.05 | 8050 | 1.5 | $6.7 \times 10^{12}$ | $1.2 \times 10^{12}$ | 1050 |
| 20 | " | " | " | " | 0.5 | 7940 | 0.9 | $7.4 \times 10^{12}$ | $1.4 \times 10^{12}$ | 1390 |
| 21 | " | " | " | " | 1.0 | 7710 | 0.7 | $7.1 \times 10^{12}$ | $1.3 \times 10^{12}$ | 1360 |
| 22 | " | " | " | " | 3.0 | 7520 | 1.2 | $6.3 \times 10^{12}$ | $1.1 \times 10^{12}$ | 1180 |
| 23 | " | " | " | " | 6.0 | 7050 | 2.4 | $3.5 \times 10^{12}$ | $6.0 \times 10^{11}$ | 1030 |
| 24* | " | " | " | " | 9.0 | 6590 | 3.1 | $1.6 \times 10^{12}$ | $2.4 \times 10^{11}$ | 690 |
| 25* | 9 | 35 | 35 | 30 | — | 6790 | 1.0 | $8.2 \times 10^{12}$ | $6.8 \times 10^{11}$ | 580 |
| 26 | " | " | " | " | 0.1 | 6910 | 0.8 | $1.0 \times 10^{12}$ | $9.2 \times 10^{11}$ | 1290 |
| 27 | " | " | " | " | 1.0 | 6600 | 0.6 | $9.6 \times 10^{12}$ | $8.8 \times 10^{11}$ | 1260 |
| 28* | 10 | 28 | 42 | " | — | 7670 | 2.8 | $2.0 \times 10^{12}$ | $7.5 \times 10^{11}$ | 600 |
| 29 | " | " | " | " | 0.1 | 7860 | 2.1 | $3.9 \times 10^{12}$ | $1.5 \times 10^{12}$ | 1350 |
| 30 | " | 28 | " | " | 1.0 | 7490 | 1.6 | $3.2 \times 10^{12}$ | $1.2 \times 10^{12}$ | 1360 |
| 31* | 11 | 24 | 36 | 40 | — | 10530 | 1.8 | $5.5 \times 10^{12}$ | $4.3 \times 10^{11}$ | 570 |
| 32 | " | " | " | " | 0.05 | 10750 | 1.6 | $5.9 \times 10^{12}$ | $5.0 \times 10^{11}$ | 980 |
| 33 | " | " | " | " | 0.5 | 10610 | 0.9 | $6.8 \times 10^{12}$ | $5.6 \times 10^{11}$ | 1320 |
| 34 | " | " | " | " | 1.0 | 10230 | 0.8 | $6.1 \times 10^{12}$ | $5.3 \times 10^{11}$ | 1340 |
| 35 | " | " | " | " | 3.0 | 9980 | 1.4 | $5.4 \times 10^{12}$ | $4.4 \times 10^{11}$ | 1160 |
| 36 | " | " | " | " | 6.0 | 9340 | 2.5 | $2.9 \times 10^{12}$ | $3.7 \times 10^{11}$ | 1030 |
| 37* | " | " | " | " | 9.0 | 8690 | 3.3 | $8.7 \times 10^{11}$ | $8.6 \times 10^{10}$ | 610 |
| 38* | 12 | 20 | 30 | 50 | 0 | 7980 | 0.5 | $6.8 \times 10^{12}$ | $1.7 \times 10^{11}$ | 630 |
| 39 | " | " | " | " | 0.1 | 8030 | 0.4 | $8.1 \times 10^{12}$ | $2.6 \times 10^{11}$ | 1340 |
| 40 | " | " | " | " | 1.0 | 7710 | 0.3 | $7.6 \times 10^{12}$ | $2.3 \times 10^{11}$ | 1290 |
| 41* | 13 | 19.5 | 45.5 | 35 | — | 3450 | 2.2 | $4.2 \times 10^{12}$ | $8.3 \times 10^{11}$ | 570 |
| 42 | " | " | " | " | 1.0 | 3380 | 1.5 | $5.6 \times 10^{12}$ | $1.2 \times 10^{12}$ | 1280 |
| 43* | 14 | 16.5 | 38.5 | 45 | — | 7200 | 2.4 | $3.7 \times 10^{12}$ | $3.8 \times 10^{11}$ | 610 |
| 44 | " | " | " | " | 1.0 | 7040 | 1.7 | $4.9 \times 10^{12}$ | $5.7 \times 10^{11}$ | 1370 |
| 45* | 15 | 13.5 | 31.5 | 55 | — | 11880 | 1.9 | $4.1 \times 10^{12}$ | $1.5 \times 10^{11}$ | 650 |
| 46 | " | " | " | " | 0.05 | 11930 | 1.4 | $4.6 \times 10^{12}$ | $1.8 \times 10^{11}$ | 1050 |
| 47 | " | " | " | " | 0.5 | 11950 | 1.1 | $6.1 \times 10^{12}$ | $2.6 \times 10^{11}$ | 1410 |
| 48 | " | " | " | " | 3.0 | 11230 | 1.1 | $3.9 \times 10^{12}$ | $1.5 \times 10^{11}$ | 1220 |
| 49 | " | " | " | " | 6.0 | 10560 | 2.7 | $1.1 \times 10^{12}$ | $4.0 \times 10^{10}$ | 1040 |
| 50* | 16 | 16 | 64 | 20 | — | 1030 | 2.5 | $1.3 \times 10^{12}$ | $7.3 \times 10^{10}$ | 540 |
| 51* | 17 | 10 | 40 | 50 | — | 5620 | 2.3 | $4.5 \times 10^{12}$ | $1.2 \times 10^{11}$ | 620 |
| 52 | " | " | " | " | 1.0 | 5470 | 1.5 | $5.8 \times 10^{12}$ | $2.0 \times 10^{11}$ | 1320 |
| 53* | 18 | 8 | 32 | 60 | — | 13400 | 3.2 | $3.2 \times 10^{12}$ | $8.2 \times 10^{10}$ | 650 |
| 54 | " | " | " | " | 1.0 | 12960 | 2.4 | $4.1 \times 10^{12}$ | $1.3 \times 10^{11}$ | 1380 |

TABLE V-continued

| Sample No. | \# No | Ratio of main ingredients (mol %) | | | Additive quantity of auxiliary ingredients (mol %) | Dielectric constant | Dielectric loss (%) | Specific resistivity at 20° C. ($\Omega \cdot$ cm) | Specific resistivity at 125° C. ($\Omega \cdot$ cm) | Bend strength (Kg/cm²) |
|---|---|---|---|---|---|---|---|---|---|---|
| | | $Pb(Mg_{\frac{1}{2}}W_{\frac{1}{2}})O_3$ | $PbTiO_3$ | $Pb(Ni_{\frac{1}{3}}Nb_{\frac{2}{3}})O_3$ | $Pb(Mn_{\frac{1}{3}}Sb_{\frac{2}{3}})O_3$ | | | | | |
| 55* | 19 | 6 | 24 | 70 | — | 9250 | 0.3 | $2.8 \times 10^{12}$ | $4.3 \times 10^{10}$ | 610 |
| 56 | " | " | " | " | 1.0 | 8980 | 0.3 | $3.5 \times 10^{12}$ | $6.7 \times 10^{10}$ | 1290 |
| 57* | 20 | 4 | 36 | 60 | — | 14500 | 0.8 | $6.5 \times 10^{11}$ | $4.5 \times 10^{9}$ | 590 |

Remarks:
Samples marked with symbol * are basic compositions.

As can be noted from this Table V, the ceramic composition of this Example has a high dielectric constant of 2950 to 12960, a low dielectric loss of 0.3 to 2.8%, a high specific resistivity of $1.1 \times 10^{12}$ to $1.7 \times 10^{13}$ ohm cm at 20° C. and $4.0 \times 10^{10}$ to $3.8 \times 10^{12}$ ohm cm even at a high temperature of 125° C., and a sufficiently high bend strength of 980 to 1410 Kg/cm².

Again the sintering temperature of the Example is below 1050° C.

The reason for limiting the quantity of the auxiliary ingredient to be in the range of 0.05 to 6 mol % lies in that in regions on the outside of lines interconnecting points 2 and 6 and points 17 and 19, the specific resistivity at high temperatures decreases, that in the regions on the outside of lines interconnecting points 6, 13 and 17 the Curie point shifts greatly toward the high temperature side, thereby reducing the dielectric constant, and that in a region on the outside of the points 19 and 2, the Curie point greatly shifts toward the low temperature side, thus decreasing the dielectric constant.

When the quantity of the auxiliary ingredient $Pb(Mn_{\frac{1}{3}}Sb_{\frac{2}{3}})O_3$ is less than 0.05 mol %, the bend strength can not be improved as desired, whereas when the quantity exceeds beyond 6 mol %, the bend strength decreases.

What is claimed is:

1. A ceramic composition consisting essentially of lead magnesium tungstate $[Pb(Mg_{\frac{1}{2}}W_{\frac{1}{2}})O_3]$, lead titanate $[PbTiO_3]$ and lead nickel niobate $[Pb(Ni_{\frac{1}{3}}Nb_{\frac{2}{3}})O_3]$ wherein the composition is expressed by $[Pb(Mg_{\frac{1}{2}}W_{\frac{1}{2}})O_3]_x[PbTiO_3]_y[Pb(Ni_{\frac{1}{3}}Nb_{\frac{2}{3}})O_3]_z$ where $x+y+z+1.00$, said composition lies on lines interconnecting five points (x=0.693, y=0.297, z=0.01) (x=0.495, y=0.495, z=0.01), (x=0.195, y=0.455, z=0.35), (x=0.10, y=0.40, z=0.50) and (x=0.06, y=0.24, z=0.70) and in a region bounded by said lines.

2. The ceramic composition according to claim 1 which further comprises 0.02 to 3 atomic % of at least one auxiliary ingredient selected from the group consisting of Nb, Ta and Sb.

3. The ceramic composition according to claim 1 which further comprises 0.05 to 8 mol % of $[Pb(Mn_{\frac{1}{3}}Ta_{\frac{2}{3}})O_3]$.

4. The ceramic composition according to claim 1 which further comprises 0.05 to 10 mol % of $[Pb(Mn_{\frac{1}{3}}Nb_{\frac{2}{3}})O_3]$.

5. The ceramic composition according to claim 1 which further comprises 0.05 to 6 mol % of $[Pb(Mn_{\frac{1}{3}}Sb_{\frac{2}{3}})O_3]$.

6. The ceramic composition according to claim 1 wherein said composition is sintered at a temperature of 900° to 1050° C.

* * * * *